(12) United States Patent
Hwang et al.

(10) Patent No.: US 6,339,599 B1
(45) Date of Patent: Jan. 15, 2002

(54) COLLISION HANDLING SCHEME FOR DISCRETE MULTI-TONE DATA COMMUNICATIONS NETWORK

(75) Inventors: Chien-Meen Hwang, San Jose; Hungming Chang, Cupertino; Maged F. Barsoum, Sunnyvale; Muoi V. Huynh; Eugen Gershon, both of San Jose; Fred Berkowitz, Palo Alto, all of CA (US)

(73) Assignee: Legerity, Austin, TX (US)

( * ) Notice: Subject to any disclaimer, the term of this patent is extended or adjusted under 35 U.S.C. 154(b) by 0 days.

(21) Appl. No.: 09/286,987

(22) Filed: Apr. 7, 1999

(51) Int. Cl.[7] .................................................. H04J 3/24
(52) U.S. Cl. ...................................... 370/445; 370/447
(58) Field of Search ................................ 370/445, 447, 370/461, 462, 449, 448, 324, 341, 210, 499, 495, 446

(56) References Cited

U.S. PATENT DOCUMENTS

| | | | |
|---|---|---|---|
| 4,701,909 A | * 10/1987 | Kavehrad et al. | |
| 4,776,041 A | * 10/1988 | Husbands | ................... 435/607 |
| 4,885,743 A | * 12/1989 | Helbers et al. | ................ 370/85 |
| 5,012,467 A | * 4/1991 | Crane | ........................ 370/85.3 |
| 5,644,573 A | 7/1997 | Bingham et al. | |
| 5,892,929 A | * 4/1999 | Welker | ........................ 399/287 |
| 5,982,779 A | * 11/1999 | Krishnakumar et al. | .... 570/447 |

FOREIGN PATENT DOCUMENTS

EP             0 760 564 A2     7/1996

* cited by examiner

*Primary Examiner*—Douglas Olms
*Assistant Examiner*—Ken Vanderpuye
(74) *Attorney, Agent, or Firm*—McDermott, Will & Emery

(57) ABSTRACT

A novel collision detecting method at the physical layer is provided for use in a multi-point DMT communication system. A time mark transmitted at the beginning of a portion of a random access data communication is followed by an ID signal for identifying the communication station. The ID signal produced based on the time mark may be transmitted between the time mark and a data portion of the random access data communication. The time mark distorted by a communication channel is received by a receiver of the station that transmitted it. An additional ID signal representing the same ID data as the ID signal is produced based on the received time mark. The additional ID signal is compared with the ID signal received from the communication channel. A collision event is detected if the incoming ID signal does not match the additional ID signal. In response to the detection of the collision event, the transmission of the data portion is terminated.

15 Claims, 7 Drawing Sheets

COLLISION HANDLING SCHEME FOR DISCRETE MULTI-TONE DATA COMMUNICATIONS NETWORK

FIELD OF THE INVENTION

The present invention relates to data communications, and more particularly, to a collision detection scheme in a discrete multi-tone (DMT) data communications network, for example network for communications between multiple devices coupled to existing wiring, such as twisted pair telephone wiring in the user's residence.

BACKGROUND ART

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol and a prescribed network medium, such as a twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples, under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL based service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line, either through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently QAM modulated signals, each carried over a distinct carrier frequency channel. The frequency separation of each carrier is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform.

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over existing in-home wiring. The adaptations should enable multi-point communications. Also, many of the problems overcome by complex methodologies in ADSL communications need corresponding simpler, more cost effective solutions for in-home networking.

Unlike the point-to-point implementations where communications are always on-going and enable virtually continuous synchronization between transmitter and receiver, the random access type devices only send when they have data to send. As various transmission devices may try to use a shared transmission medium simultaneously, it would be desirable to create an effective collision handling scheme.

Due to the nature of communications over existing wiring, it is difficult to physically detect a collision event when multiple devices transmit data packets at the same time. A typical communications protocol requires each packet transmission to be acknowledged by the receiver. In response to a received data packet, the receiver transmits an acknowledgement (ACK) signal, which indicates to the original transmitter that the data packet was received without errors. Accordingly, the transmitter assumes that no collision event happened during the data packet transmission. If the ACK signal is not received, the transmitter assumes that the channel impairments cause the data packet to be lost.

A collision event caused by multiple stations competing for a shared network usually occurs at the beginning of transmission. Because the Medium Access Protocol indicates to stations on the network that the medium is free at approximately the same time, any stations with pending transmissions will begin to transmit at approximately the same time. When this occurs, the resulting transmissions will have a collision event that physically begins at or near the beginning of the transmission. However, the transmitting device is unaware of the occurrence of the collision until it has completed its attempt to transmit the data packet, and does not receive the expected ACK signal.

Thus, the collision event cannot be detected until the end of the transmission attempt. The longer the data packet, the longer it will take for the transmitting station to determine that the collision event has occurred.

Furthermore, if a collision event occurs at or near the beginning of a long data packet, most protocols and physical implementations render the entire data packet unreceivable. Therefore, the portion of the data packet after the beginning of the collision event wastes network bandwidth. The sooner a collision can be detected by a transmitter, the sooner the transmitter can end the faulted transmission and stop wasting network bandwidth.

Therefore, it would be desirable to provide a collision detecting scheme that would detect a collision event at the beginning of the transmission.

SUMMARY OF THE INVENTION

The present invention overcomes the noted problems involved in data networking and satisfies the above stated needs by providing a novel collision detecting method, at the physical layer, for use in a multi-point DMT communication system. The method of detecting a collision comprises transmitting a time mark at the beginning of a portion of a random access data communication, and transmitting a first ID signal representing ID data for identifying a communication station. The first ID signal is produced based on the time mark. Preferably, the first ID signal is transmitted between the time mark and a data portion of the random access data communication. The time mark distorted by a communication channel is received by the receiver of the communication station that transmitted it. A second ID signal representing the same ID data is produced based on the received time mark. The second ID signal is compared with the ID signal received from the communication channel. A collision event is detected if the received ID signal does not match the second ID signal. In response to detection of the collision event, the transmission of the data portion may be terminated.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data communications, the best mode for practicing the invention is based in part on the realization of a collision detection scheme in a discrete multi-tone (DMT) data communications network for communications between multiple devices coupled to existing wiring, for example twisted pair telephone wiring in the user's residence.

Figure 1:
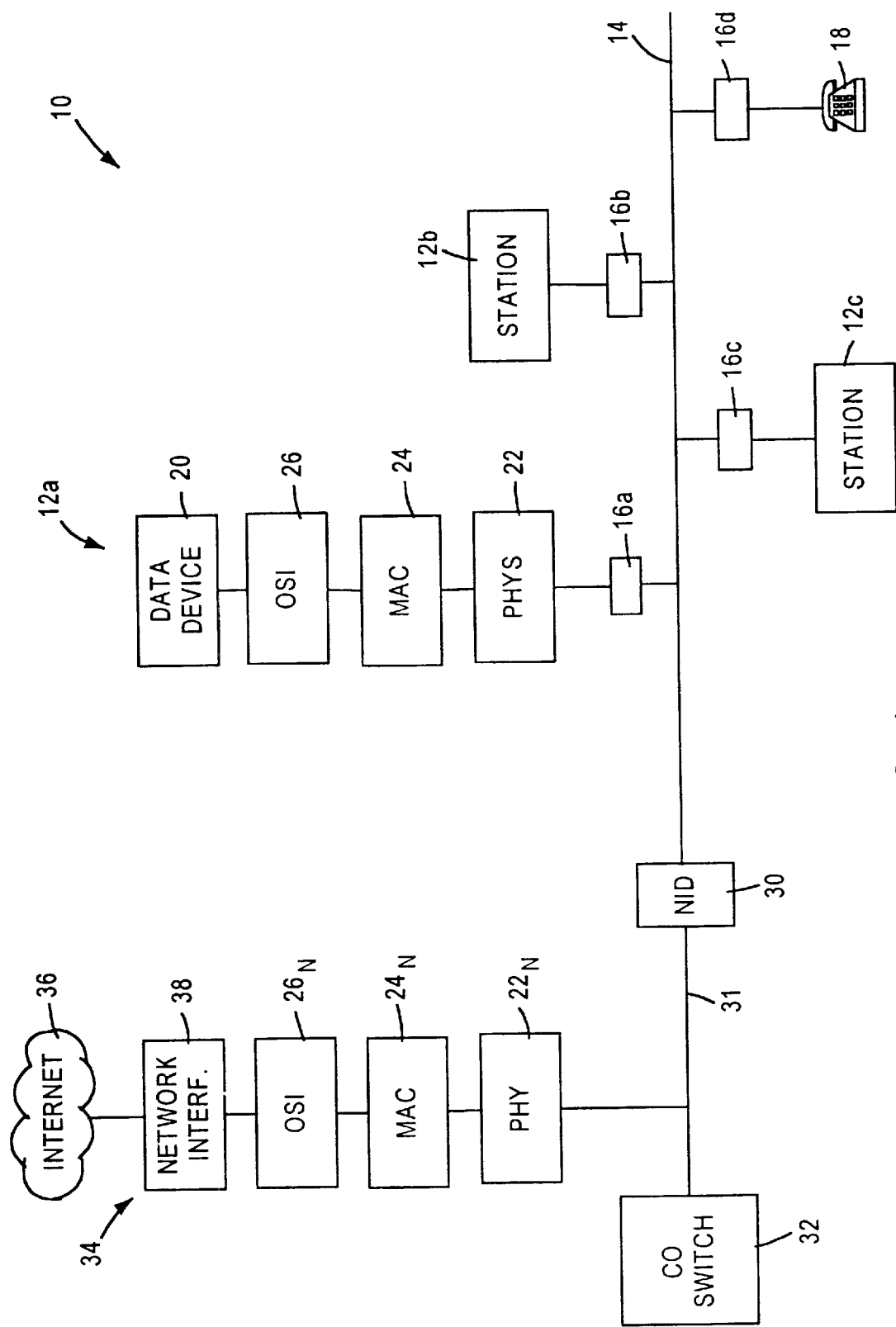
FIG. 1 is a diagram of an exemplary home local area network, in which the present invention may be implemented.

FIG. 1 is a diagram of a local area network 10 implemented in a home or similar customer premises environment using network media 14 according to an embodiment of the invention. The network may use a variety of different physical lines for the network media 14, such as coaxial cable, multi-pair cables, electrical power line wire, optical fiber or RF wireless communication links. In the preferred embodiment, the media 14 comprises twisted pair telephone wiring, commonly available in the home or office. As shown, the network 10 includes network stations 12a, 12b and 12c that are connected to a telephone line (twisted pair) wiring 14, via RJ-11 phone jacks 16a, 16b and 16c respectively. A telephone 18 connected to the RJ-11 phone jack 16d may continue to make phone calls while one or more of the stations 12 are communicating data.

As illustrated in more detail with respect to exemplary first station 12a in FIG. 1, each home network station 12 comprises a data device 20, for example a personal computer, printer, or intelligent consumer electronics device. Each station 12 also includes a physical layer (PHY) transceiver 22, a media access (MAC) layer 24, and an operating system (OS) layer 26 that performs higher layer functions according to the OSI reference model. In the inventive network, the PHY transceiver utilizes digital signal processing techniques to implement discrete multi-tone transport of digital data over the telephone wiring 14.

The stations 12 communicate by transmitting network data modulated into the analog network signals in accord with the invention. In particular, the physical layer transmitter transmits timing signals, modulated control and collision information, and packets comprising discrete multi-tone (DMT) symbols carrying the actual digital communication data. The physical layer receiver receives and processes these signals and demodulates the DMT symbols to recover the data. In accord with the invention, each random access begins with transmission of a timing mark, and the transmission of each packet of data begins with transmission of a timing mark. Signal processing in the receiver is based on recovery of timing from detection of the timing mark.

The network 10 is envisioned as a home network, and in many installations, the network 10 will provide random access to the local area network media 14 for data communications between the stations 12 within the customer premises. However, it is within the scope of the invention to utilize the DMT-based data communications to access external networks. Normally, the customer premises wiring 14 connects through a network interface device (NID) 30 to a subscriber's telephone line 31. The line 31, in turn connects to a central office (CO) switch 32 of the public switched telephone network. The switch 32 provides normal voice-grade telephone services, for example for communications using the telephone 18.

However, the line 31 may also transport DMT signals at appropriate frequencies for access to another network. In such an installation, the telephone network operator or another service provider would have a digital terminal unit 34 coupled to the subscriber's telephone line 31. The device 34 provides access to an external wide area data network, for example using ATM or SMDS to gain access to the public packet switched data network commonly referred to as the Internet. The digital terminal unit 34 includes a physical layer (PHY) transceiver $22_N$, a media access (MAC) layer $24_N$, and an operating system (OS) layer $26_N$ that perform functions similar to the transceiver 22, the MAC 24 and the OSI 26 in each of the home stations 12. In the terminal 34, however, the data device takes the form of a network interface 38 for providing the appropriate interface to the physical transport media of the higher level data network 36.

Figure 2:
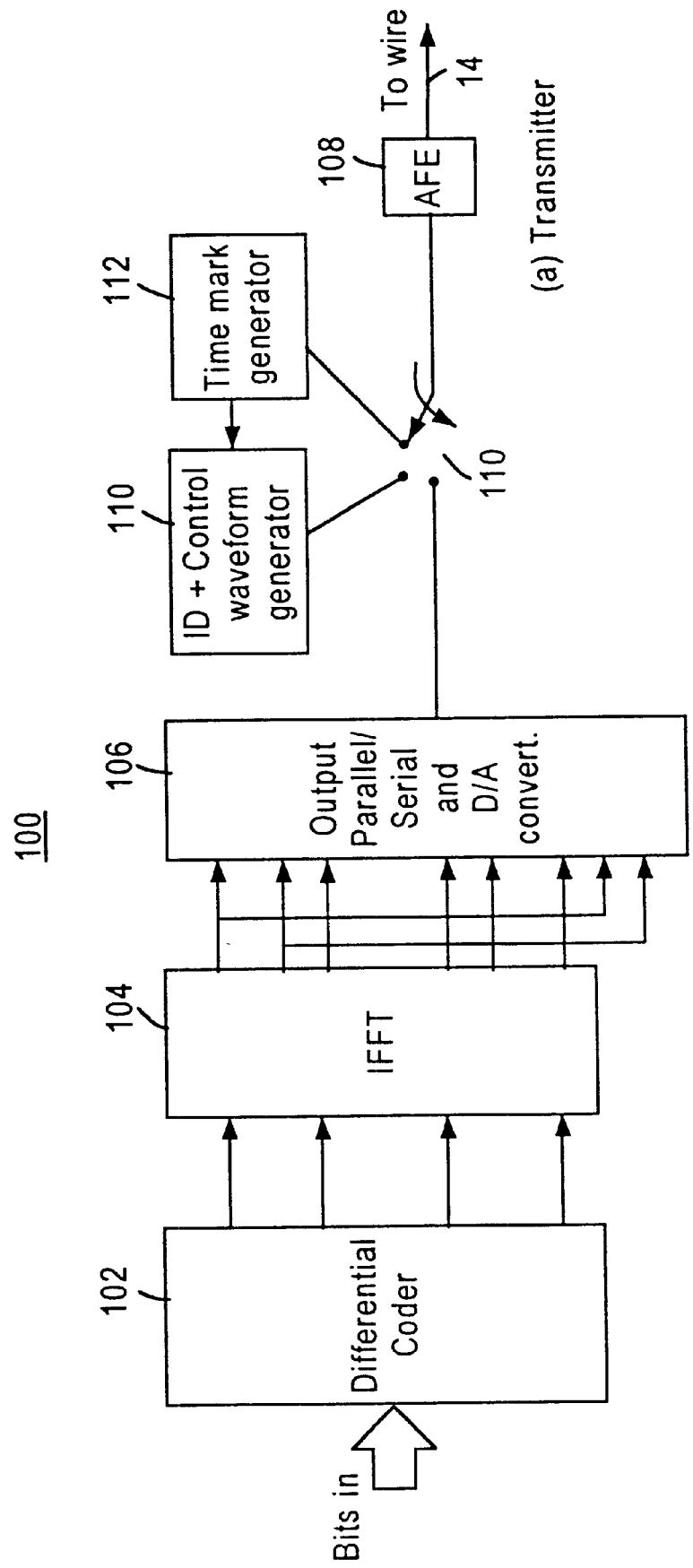
FIG. 2 is a diagram of a transmitter in a DMT communication station of the present invention.

Referring to FIG. 2 of the drawings, a transmitter 100 of the PHY transceiver 22 receives a digital bit stream from a digital source, for example a host central processing unit (CPU). The bit stream enters the differential encoder 102 as a serial input. The preferred embodiment uses a form of quadrature phase-shift keying type modulation (QPSK). The QPSK modulation technique essentially modulates two bits onto each modulated tone. As such, there are only four points in the constellation. Preferably, the DMT link utilizes a differential modulation technique. For example, if QPSK is used, the transmitter would generate the tone signal corresponding to a difference in phase representing the constellation point (2-bits of information).

The encoder 102 maps bit sequences of the serial stream to points on the complex plane (i.e., constellation points), in similar fashion to the operating principles of QPSK (quaternary phase shift keying). However, unlike QPSK, the differential encoder 63 encodes the difference between a current constellation point and a reference constellation point. The difference may be with respect to the constellation point modulated on an adjacent tone, or preferably, the difference is with respect to the constellation point carried within the tone channel during the previous symbol. DMT systems can modulate tones with up to 15 bits of information, using quadrature amplitude modulation (QAM). Those skilled in the art will recognize that the differential modulation may be extended to QAM, to enable transport of higher numbers of bits per tone and per symbol.

In an exemplary embodiment, the differential encoder 63 encodes a bit stream in bit sequences of 2-bits per tone using 256 tone frequencies; as a result, a symbol represents 512 bits. Because the encoding scheme focuses on phase differences, absolute signal values are not needed for correctly detecting and decoding the received symbols. As such, this technique eliminates the need for a frequency domain equalizer (FEQ) to compensate for amplitude and phase distortion caused by the channel 14.

For ease of discussion, the following description assumes differential quadrature phase-shift keying type modulation (DQPSK). Because of the relatively short distances involved in communication over in-home wiring, typically all 256 tones provide adequate transport for the DQPSK modulated signals. However, it is within the scope of the invention to vary the modulation and thus the number of bits modulated onto each tone and/or to vary the number of tones utilized in a particular installation or even during a particular communication session. For example, there may be installations were certain tones are unusable, due to noise or poor line characteristics. In another installation, all tones may be usable, but some can carry differential QAM modulation for various numbers of bits up to 15 bits, but other tones provide only adequate transport for the 2-bit DQPSK. Where the number of tones and/or the modulation and bit rates of the tones may vary from some set standard, the terminals on the line would periodically execute a "training" routine to determine the performance of each tone channel and appropriately set the modulation characteristics for each tone.

The output of the differential encoder 102 is a parallel array of "complex numbers" representing phase and amplitude information for each fundamental tone frequency, i.e. expressed in frequency domain values. These complex numbers are input in a parallel manner into an Inverse Fast Fourier Transform (IFFT) logic circuit 104. The IFFT logic 104 converts the complete set of complex numbers from the frequency domain into time-domain samples.

The analog signal for a DMT symbol comprises a complex waveform. Any waveform can be mathematically expressed as a sum of sinusoidal waveforms of various frequencies, phases and amplitudes. The DMT symbol waveform essentially corresponds to the sum of the tone signals (sinusoids) used for the communication, at their respective frequencies and having at least different phases determined by the data modulated on the respective tones. The tone signals may also vary in amplitude as a function of additional bits of data.

Stated another way, the IFFT logic circuit 104 essentially calculates the sinusoidal waveform for each of the 256 tones, including the phase and/or amplitude associated with the constellation point for each tone frequency. In the example, the DMT waveform should be 256 microseconds long. Assuming a 2 MHz sampling rate, there should be 512 samples to generate an analog waveform of the desired length. The IFFT 65 calculates 512 samples for each of the 256 sinusoidal tone waveforms. For each of the 512 sample intervals, the IFFT logic circuit 104 adds the calculated samples for the individual sinusoidal tone waveforms to obtain a single sample of the complex DMT waveform.

A parallel-to-serial and digital-to-analog converter 106 comprises a parallel-to-serial converter that serializes the parallel signal supplied by the IFFT logic circuit 104, and a digital-to-analog converter for converting digital information into a analog form. The information analog signal produced by the block 106 may be supplied to an analog front end (AFE) unit 108 which comprises analog processing circuitry including a line driver for producing a DMT line signal adjusted to meet specific requirements of the communication line 14. The output of the block 106 may be connected to the AFE unit 108 via a switching circuit 110.

Also, the transmitter 100 of the present invention comprises an ID and control waveform generator 112, and a time mark generator 114 connectable to the AFE 108 via the switching circuit 110 controlled by a transmitter controller to connect the block 106, generator 112 or generator 114 to the AFE unit 108.

As a packet-based DMT communication device sends a line signal only when there is data needed to be transmitted, a time mark is required to inform receiving devices about the start of data packet transmission. Therefore, at the start of a random access data communication, the transmitter 100 sends a time mark generated by the time mark generator 114. A time mark may be a predetermined digital value modulated into an analog signal.

Figure 3:
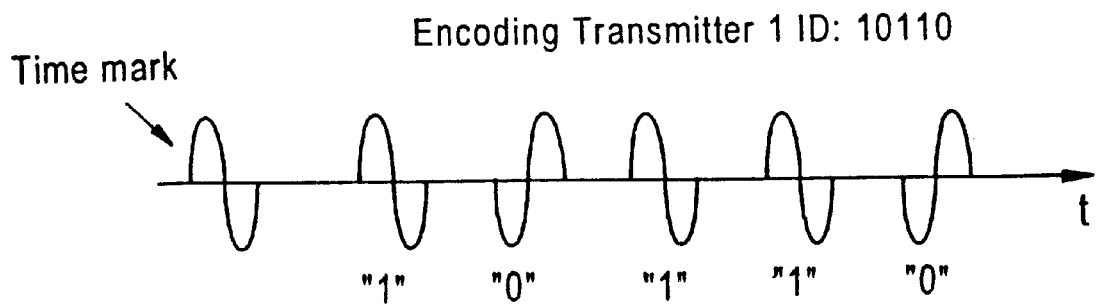
FIGS. 3 and 4 are exemplary diagrams that illustrate encoding of ID signals in transmitters.
Figure 4:
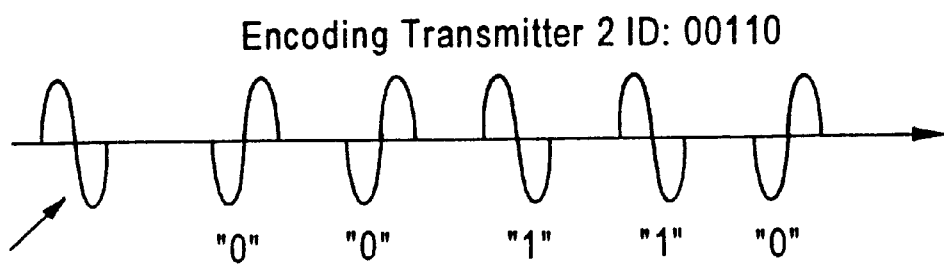

For example, as illustrated in FIGS. 3 and 4, the time mark may be modulated in the form of one or several cycles of a sinusoidal signal. However, it is to be understood that a carrier of any form, for example a square-wave carrier, may be used.

The ID and control waveform generator 110 produces a unique ID for identifying each station 12 in the network 10. As discussed below, the ID may be used to detect collision during transmission of data. Each ID may be composed of a predetermined number of symbols. For example, an ID may be a unique combination of symbols "0" and "1" modulated in the same way as the time mark, for example, in the form of sine waves.

The time mark generated by the time mark generator 112 serves as a template for modulating ID symbols. Thus, the pulse waveform of the ID utilize the same basic cyclic waveform as the timing mark. Within the ID waveform, each cycle is modulated by multiplying the waveform by a level value corresponding to the data to be carried in the respective cycle. For example, assume a two level modulation (1, -1) representing binary ones and zeroes of the ID and control information. The cycles of the timing mark correspond to ones (at level 1). Cycles within the ID waveform having a binary 1 value are multiplied by a level 1 and have the same shape. Cycles within the ID waveform having a binary 0 value are multiplied by a level -1 and appear flipped with respect to the cycle waveform of the timing mark.

Accordingly, the ID symbol "1" may correspond to a sine wave similar to a cycle of the sinusoidal signal representing the time mark. ID symbol "0" may correspond to a sine wave flipped or inverted with respect to the sine wave representing the ID symbol "1".

Thus, as illustrated in FIGS. 3 and 4, the ID symbol "1" may be represented by a sine wave having a positive value of amplitude in the first half-cycle (between 0 and $\pi$), and a negative amplitude value in the second half-cycle (between $\pi$ and $2\pi$). Symbol "0" may be represented by a sine wave having a negative value of amplitude in the first half-cycle and a positive amplitude value in the second half-cycle.

FIGS. 3 and 4 illustrate exemplary IDs of the stations 12 in accordance with the present invention. For example, one station (transmitter 1) in the network 10 may be identified by ID signal "10110" represented by the sine waves shown in FIG. 3. Another station (transmitter 2) in the network 10 may be identified by ID signal "00110" represented by the sine waves shown in FIG. 4.

Thus, in a preferred embodiment, the ID and control generator 110 produces a predetermined number of sine waves representing a unique ID of the station 12. Also, the ID and control generator 110 may produce a control signal for indicating redundancy scheme used for transmission.

Figure 5:
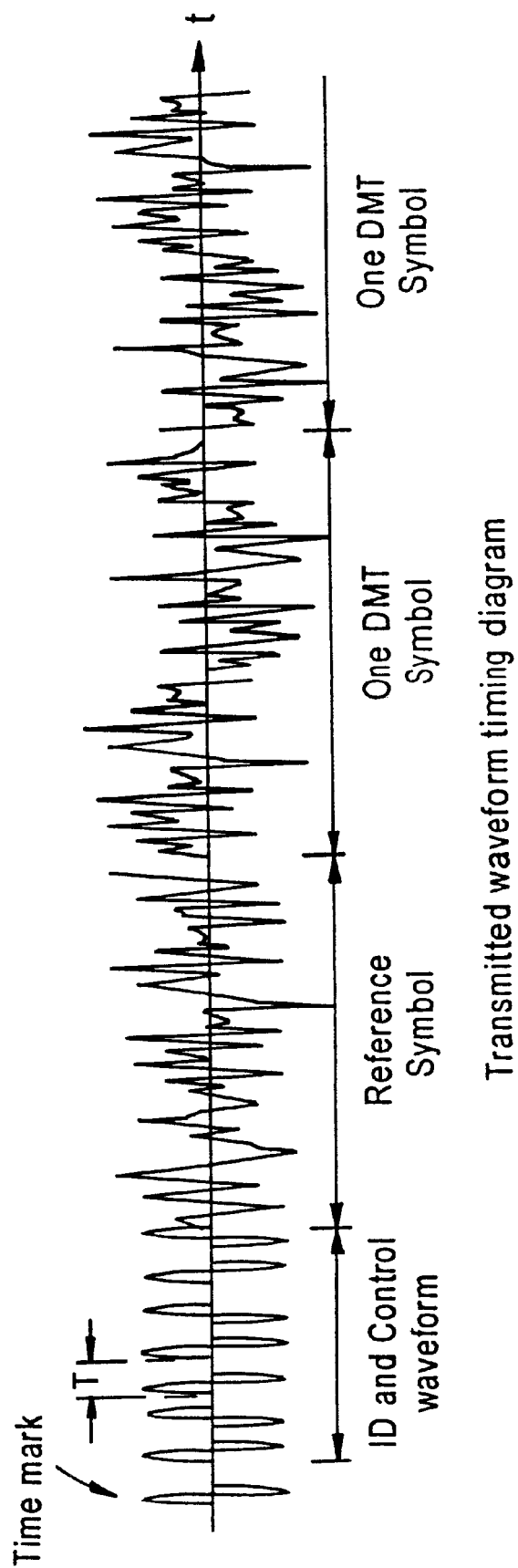
FIG. 5 is an exemplary timing diagram of a transmitted waveform

FIG. 5 illustrates an exemplary timing diagram of a waveform transmitted by the station 12. As discussed above, on the beginning of the transmission, one or several cycles of a preset sinusoidal signal is generated by the time mark generator 112 to define a time mark. The time mark is followed by an ID and control waveform generated by the ID and waveform generator 110. For example, FIG. 5 shows the ID waveform composed of five sine waves representing ID signal "10110", in which symbols "1" are represented by sine waves modulated in the same way as the time mark, and symbols "0" are represented by the sine waves inverted with respect to the sine waves corresponding to symbols "1".

The period T of the ID waveform may be determined based on measuring the length of impulse response of the channel through which one sine wave of the ID waveform is transmitted. The period T should be selected so as to be greater than the sum of the sine wave duration and the maximum length of the impulse response determined experimentally, i.e. for the channel having the worst propagation characteristics.

The control waveform illustrated in FIG. 5 is composed of two sine waves that may be modulated in the same way as the ID sine waves. The control waveform is followed by a reference symbol, which is a predefined DMT symbol used by the receiver as an assessment of the channel phase shift. The reference symbol supplied to the AFE 108 from the output of the block 106. The reference symbol is followed by DMT data symbols produced at the output of the block 106 and supplied to the line 14 via the AFE 108. For example, each DMT data symbol may contain 352 bits.

Figure 6:
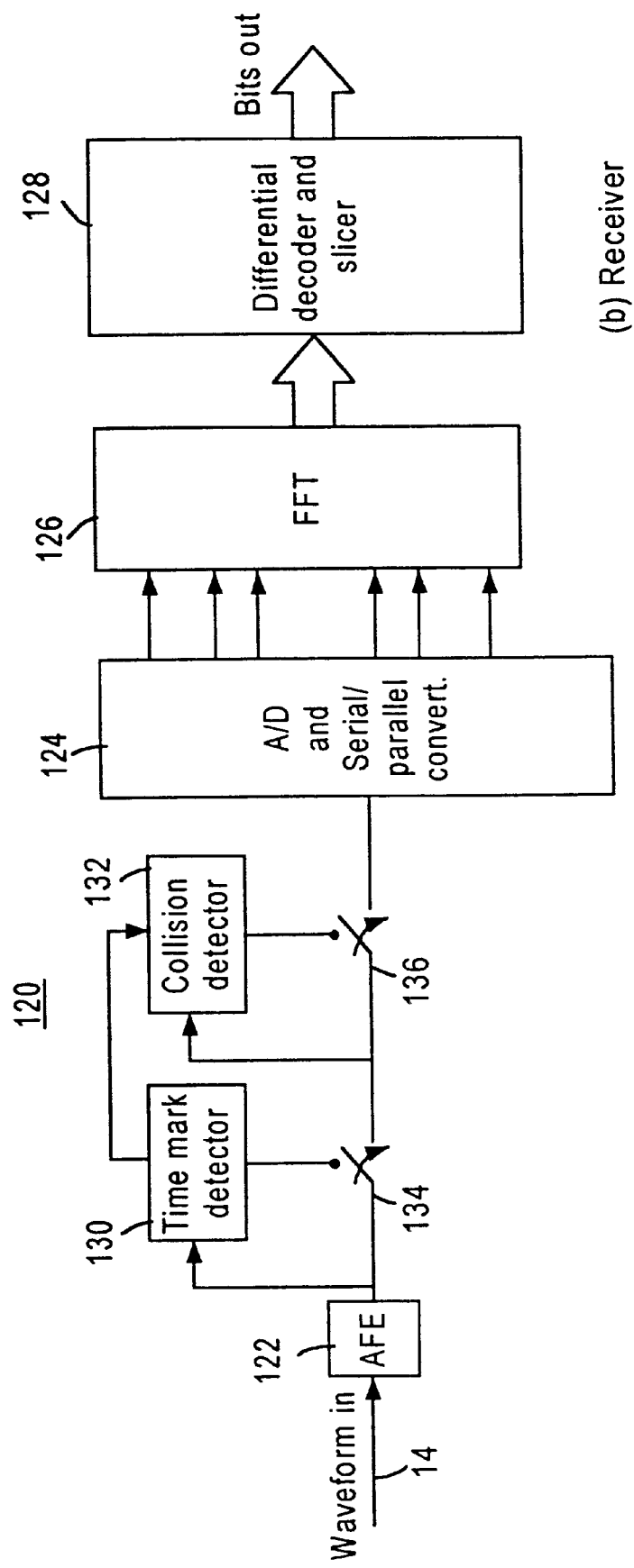
FIG. 6 is a diagram of a receiver in the DMT communication station of the present invention.

Referring to FIG. 6, a receiver 120 of the PHY transceiver 22 receives the analog signal using the AFE circuit 122, which mirrors some of the functions of the AFE circuit 108 in the transmitter 100. For example, the AFE circuit 122 is responsible for filtering the analog waveform and may include line-matching circuitry to provide impedance matching.

For symbol decoding, after processing of the received signal by the AFE circuit 122, an analog-to-digital and serial-to-parallel converting logic 124 performs an analog to digital conversion and converts the digitized or discrete waveform samples to a parallel array of waveform samples. A Fast-Fourier-Transform (FFT) processor 126 converts the time domain information of the real numbers into frequency domain information, including frequency, phase and amplitude. The differential decoder and slicer 128 maps the frequency domain information into corresponding bit sequences to recreate the original bit stream. In a DPSK system, the detected phase for each tone channel is compared to the phase for the channel detected during processing of a previous symbol. The decoder 128 essentially maps the differential phase information for each tone to a constellation and converts the constellation point to its corresponding bits of data. The bits of data derived from all of the channels of one symbol are combined into a DMT symbol.

Also, the receiver 120 includes a time mark detector 130 and a collision detector 132 used for detecting collision during data transmission. The time mark detector 130 and the collision detector 132 may be connected to the AFE circuit 122 via switching circuits 134 and 136 controlled by a receiver controller.

Figure 7:
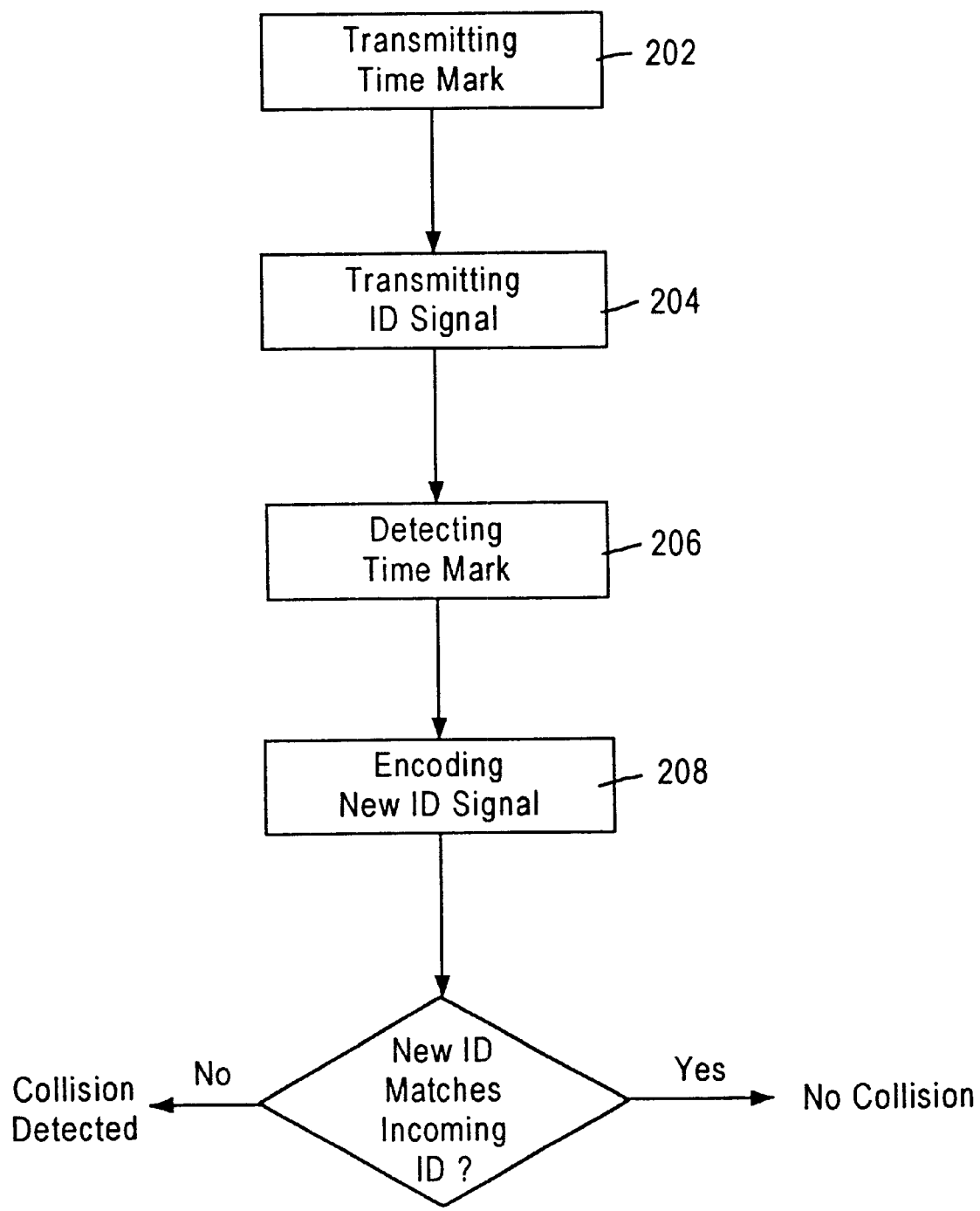
FIG. 7 is a flow chart illustrating a collision detecting method of the present invention.

Referring to a flow chart in FIG. 7, the PHY transceiver 22 detects collision as follows. As discussed above, after a time mark is transmitted (block 202), the ID and control waveform generator 110 modulates a unique ID using the time mark as a template (block 204). Within the ID waveform, each cycle is modulated by multiplying the time mark waveform by a level value corresponding to the data to be carried in the respective cycle. For example, cycles within the ID waveform having a binary 1 value may be produced by multiplying the time mark waveform by a level 1. Cycles within the ID waveform having a binary 0 value may be produced by multiplying the time mark waveform by a level −1. The ID waveform is transmitted after the time mark.

The time mark transmitted by the transmitter 100 via the line 14 is detected by all receivers in the network 10, including the receiver 120 of the transceiver 22 that transmitted the time mark. For example, the time mark transmitted by the station 12a (FIG. 1) will be received not only by the stations 12b and 12c, but also by the station 12a itself. The time mark detector 130 of the receiver 120 in the station 12a detects this time mark distorted by the communication channel (block 206) and supplies the distorted time mark to the collision detector 132.

The distorted time mark is used by the collision detector 132 to encode the ID of the station 12a based on the distorted time mark. Thus, the collision detector 132 produces a new ID having the same symbols as the original ID but modulated based on the distorted time mark.

Figure 8:
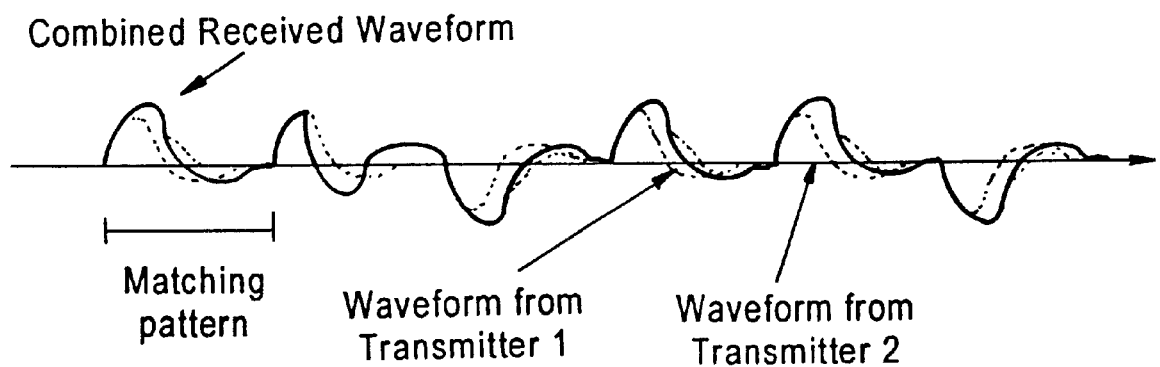
FIG. 8 is a timing diagram illustrating a combined waveform received by the receiver.

Also, the collision detector 132 receives the incoming signal from the line 14. This incoming signal may comprise the distorted ID signal transmitted by the station 12a, as well as an ID signal of any other station, for example, station 12b. As an ID signal transmitted by the station 12a will propagate along the same path as the time mark transmitted by this station, the ID signal will be distorted in the same way as the time mark. FIG. 8 illustrates a combined received ID waveform from the station 12a having ID represented by symbols "10110" (transmitter 1) and from the station 12b having ID represented by symbols "00110" (transmitter 2).

Figure 9:
FIG. 9 is a timing diagram illustrating a residue waveform indicating a collision event.

The collision detector 132 determines whether the new ID signal produced based on the distorted time signal matches the received ID waveform (block 210). For example, the collision detector may use an analog subtraction device to subtract the received ID waveform from the new ID waveform. FIG. 9 illustrates a residue waveform that would be produced at the output of the analog subtractor if the received ID waveform differs from the new ID signal produced by the collision detector 132. Alternatively, a digital subtraction device may be used to perform matching of the received ID waveform with the new ID waveform produced by the collision detector 132.

If no substantial residue waveform is produced, the collision detector 132 concludes that there is no collision. However, if the collision detector 132 detects a substantial resultant signal at the output of the subtracting device, a collision is reported to the transmitter 100 to terminate data transmission. For example, the collision detector 132 may compare the resultant signal with a preset threshold level, to report collision if the resultant signal exceeds the threshold level. The threshold level may be established based on experimental results.

As the ID of the station is a short signal transmitted before transmitting a data packet, the collision scheme of the present invention enables the transmitter to detect collision at the beginning of the transmission to avoid wasting network bandwidth.

Thus, the station detects collision by means of comparing its own ID signal produced based on a time mark distorted by channel, with an incoming ID signal received from the network. If the ID signal of the station matches the incoming ID signal, the station concludes that no other station performs transmission. However, if the ID signal of the station differs from the incoming ID signal, the station detects a collision event and prevents its transmitter from transmitting a data packet.

Those skilled in the art will recognize that the present invention admits of a number of modifications, within the spirit and scope of the inventive concepts. For example, the DMT transmitter and the DMT receiver may be implemented in a number of different ways. These circuits in the transceivers may be implemented as specifically engineered chips having logic circuits and other components for performing the functions described above. Alternatively, one or both may be implemented using a general purpose digital signal processor and appropriate programming. Also, a number of different circuits or software procedures may be used for the time mark detector and collision detector. For example, these detectors may rely on digital signal processing techniques. Essentially, the detection of a sinusoidal time mark involves sampling the analog waveform at the normal sampling rate, and analyzing a number of the samples to detect a condition thereof corresponding to the sinusoidal time mark, for example to recognize a waveform repeating at or about the expected frequency or periodicity.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a data communications device, a method of detecting a collision, comprising:

transmitting a time mark at the beginning of a portion of a random access data communication, transmitting a first ID signal representing ID data for identifying the device, the first ID signal being produced based on the time mark, receiving the time mark distorted by a communication channel, based on the received time mark, producing a second ID signal representing the ID data, receiving an incoming ID signal from the communication channel, comparing the second ID signal with the incoming ID signal, and detecting a collision event if the incoming ID signal does not match the second ID signal.

2. The method of claim 1, wherein the first ID signal is transmitted between the time mark and a data portion of the random access data communication.

3. The method of claim 2, wherein transmission of the data portion is terminated in response to detection of the collision event.

4. The method of claim 1, wherein the first ID signal comprises a first ID waveform produced based on a waveform of the time mark.

5. The method of claim 4, wherein the second ID signal comprises a second ID waveform produced based on a waveform of the received time mark distorted by the channel.

6. The method of claim 1, wherein the first ID signal comprises a plurality of first ID waveforms respectively representing a plurality of ID symbols.

7. The method of claim 6, wherein each of the first waveforms is encoded based on a waveform of the time mark.

8. The method of claim 1, wherein the time mark includes a cycle of a sinusoidal waveform.

9. The method of claim 8, wherein a first preset symbol of the ID data is represented by a first sine wave similar to the cycle of the sinusoidal waveform in the time mark.

10. The method of claim 9, wherein a second present symbol of the ID data is represented by a second sine wave inverted with respect to the cycle of the sinusoidal waveform in the time mark.

11. The method of claim 1, wherein the collision event is detected if difference between the incoming ID signal and the second ID signal exceeds a threshold level.

12. A discrete multi-tone communication station for use on an analog link carrying modulated digital data, comprising:

a time mark generator for producing a time mark transmitted on the beginning of a portion of a random access data communication, an ID generator for producing an ID signal to be transmitted, together with a discrete multi-tone signal, via the link, the ID signal being produced based on the time mark and having ID data identifying the station, and a collision detector for detecting a collision event if ID information carried by an incoming ID signal differs from the ID data.

13. The station of claim 12 further comprising a time mark detector for detecting the time mark distorted by the link.

14. The station of claim 13, wherein the collision detector compares the incoming ID signal with a detection ID signal produced based on the time mark distorted by the link, to determine whether or not the ID information carried by the incoming ID signal differs from the ID data.

15. The station of claim 14, wherein the collision detector detects the collision event if the incoming ID signal matches the detection ID signal.

* * * * *